United States Patent
Mak

(10) Patent No.: US 9,839,097 B2
(45) Date of Patent: Dec. 5, 2017

(54) METHOD AND APPARATUS FOR CONTROLLING LAMP BASED ON SWITCHING ACTION

(71) Applicant: Wilson Yu Sang Mak, Kwai Chung NT. (CN)

(72) Inventor: Wilson Yu Sang Mak, Kwai Chung NT. (CN)

(73) Assignee: SMART HERO ENTERPRISES LIMITED, Kwai Chung NT. (CN)

( * ) Notice: Subject to any disclaimer, the term of this patent is extended or adjusted under 35 U.S.C. 154(b) by 0 days.

(21) Appl. No.: 15/357,996

(22) Filed: Nov. 21, 2016

(65) Prior Publication Data

US 2017/0325315 A1   Nov. 9, 2017

(30) Foreign Application Priority Data

May 9, 2016   (CN) .......................... 2016 1 0301179

(51) Int. Cl.
*H05B 37/02* (2006.01)

(52) U.S. Cl.
CPC ......... *H05B 37/02* (2013.01); *H05B 37/0281* (2013.01)

(58) Field of Classification Search
CPC .............................. H05B 37/02; H05B 37/0281
USPC ......................................................... 315/307
See application file for complete search history.

(56) References Cited

U.S. PATENT DOCUMENTS

| 7,339,471 B1* | 3/2008 | Chan ..................... G08B 15/002 315/159 |
| 2014/0265871 A1* | 9/2014 | Ku ...................... H05B 37/0245 315/152 |

* cited by examiner

*Primary Examiner* — Daniel D Chang
(74) *Attorney, Agent, or Firm* — Kleinberg & Lerner, LLP.; Marshall A. Lerner; Marvin H. Kleinberg

(57) ABSTRACT

The present application relates to a method for controlling a lamp based on a switching action. By applying the present application, switching of a working state of a lamp can be realized by controlling the switching-on and switching-off states of the lamp using a single switch. In the present method, if a switching-on action is detected, the lamp is switched on, and if a switching-off action is detected, the lamp is switched off; another switching-on action performed within a period t0 after the switching-off action is detected is defined as a quick switching-off-and-on operation. The steps of the present method may be realized by functional modules, which may be implemented by a computer program stored in a computer-readable storage medium.

13 Claims, 1 Drawing Sheet

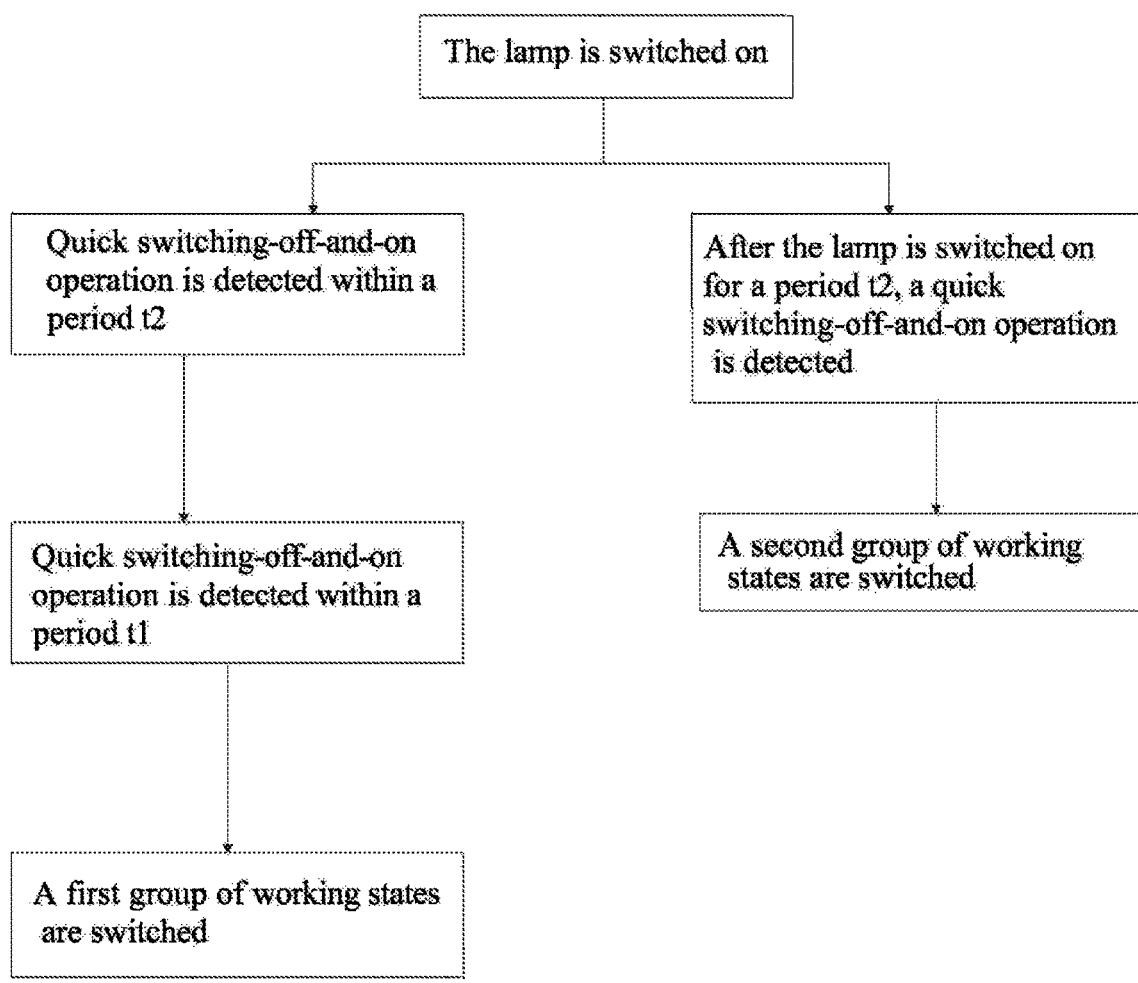

METHOD AND APPARATUS FOR CONTROLLING LAMP BASED ON SWITCHING ACTION

TECHNICAL FIELD

The present application relates to a method for controlling a lamp based on a switching action. The steps of the present method may be realized by functional modules, which may be implemented by a computer program stored in a computer-readable storage medium.

BACKGROUND ART

With the development of lighting devices, sensor lamps, multi-color temperature lamps and multi-color lamps are widely used, and even lamps with various working states such as a sensing working state and a multi-color temperature working state are developed. Most lamps with multiple working states need multiple switching devices to respectively control the switching of the multiple working states, so their use is not convenient. For example, a sensor lamp with adjustable color temperatures at least needs two switching devices, as it needs to switch its different color temperatures and working modes, such as a sensing working mode and a continuous lighting working mode.

SUMMARY

An objective of the present application is to provide a method for controlling a lamp based on a switching action. By applying the present application, switching of a working state of a lamp can be realized by controlling the switching-on and switching-off states of the lamp using a single switch.

To realize the above objective, there is provided a method for controlling a lamp based on a switching action, wherein if a switching-on action is detected, the lamp is switched on, and if a switching-off action is detected, the lamp is switched off; wherein, another switching-on action performed within a period t0 after the switching-off action is detected is defined as a quick switching-off-and-on operation; when the lamp is switched on, after a quick switching-off-and-on operation is detected, if another quick switching-off-and-on operation is detected within a period t1, a first group of working states are switched; and if the lamp is switched on for a period t2 which is longer than the period t1, and if yet another quick switching-off-and-on operation is detected, a second group of working states are switched.

It is well-known that conventional switching-on and switching-off actions are realized by existing switching devices. The quick switching-off-and-on operation in the present application requires the switching-on action to be performed within the period t0 after the switching-off action is performed. A computer program can identify such a quick switching-off-and-on operation based on the above feature, instead of a conventional operation in which a switching-on action is performed for using the lamp again after the lamp is switched off. As the quick switching-off-and-on operation in the present application only uses switching-on and switching-off signals, existing switching devices can be used for the input without the need of adding other input devices, and a computer program can identify the quick switching-off-and-on operation. Based on the above, depending on how fast the switching-on action or switching-off action is performed after the lamp is switched on—depending on whether the quick switching-off-and-on operation is performed in the period t1 or after the period t2, if a user wants to switch the first or second group of working states can be distinguished. Therefore, as conventional switching-on and switching-off actions are realized by existing switching devices, switching operations for the first and second groups of working states can be performed without the need of adding other input devices.

If a user only wants to switch the second group of working states, he/she needs to perform the following operation: after the lamp is switched on for the period t2, a quick switching-off-and-on operation is performed to switch the second group of working states.

If the user wants to switch both the first and second group of working states, he/she had better perform the following operations: after the lamp is switched on for the period t2, a quick switching-off-and-on operation is performed to switch the second group of working states; after the second group of working states are switched, another quick switching-off-and-on operation is performed within the period t1 to switch the first group of working states.

If the user only wants to switch the first group of working states, he/she had better perform the following operation: after the lamp is switched on, a quick switching-off-and-on operation is performed; then another quick switching-off-and-on operation is performed within the period t1 to switch the first group of working states. If the lamp has been switched on for the period t2, the user may need to perform the following operation: yet another quick switching-off-and-on operation is performed to switch the second group of working states; yet another quick switching-off-and-on operation is performed within the period t1 to switch the first group of working states; then yet another quick switching-off-and-on operation is performed to switch the second group of working states until the original one of the second group of working states is switched back.

The present application can produce the following advantageous effect: the switching-on and switching-off states, and multiple working states of the lamp can be switched by using a single switch.

BRIEF DESCRIPTION OF DRAWINGS

FIG. 1 is a diagram showing the operation of the invention.

DETAILED DESCRIPTION

A user uses a three-color-temperature sensor lamp controlled by a single switch. The lamp has two groups of working states, namely, a group of color temperature working states and a group of working modes. The first group of working states includes three levels of color temperatures, 3,000K, 4,000K and 5,000K. The working modes of the second group of working states include a sensor working mode and a continuous lighting working mode.

The switch of the lamp is used to control the switching-on and switching-off states of the lamp and switch the working states of the lamp. Each time the user presses the switch, a switching-on signal or a switching-off signal is output. When the lamp is switched off, the signal represents a switching-on action; and when the lamp is switched on, the signal represents a switching-off action. If there is no switching-on action after the user switches off the lamp for 6 seconds (t3), a computer will deem that the lamp is in the completely off state. If the lamp is switched on again in the state, the lamp will work in the sensor working mode set by a computer program by default. In this way, confusion can be avoided, and the current working state of the lamp can be determined easily if the user forgets the working mode of the lamp when the lamp is switched off last time. The value of t3 may be set in the range of 3-10 seconds.

If there is a switching-on action within 0.5-3 seconds (t0) following a switching-off action, the computer program will deem such an operation as a quick switching-off-and-on operation, instead of a conventional operation in which a switching-on action is performed for using the lamp again after the lamp is switched off.

If the user does not think that a color temperature of 3,000K is high enough after the lamp is switched on, the user needs to perform a first quick switching-off-and-on operation within 15 seconds. If a second quick switching-off-and-on operation is performed within 0.5-3 seconds (t1) following the first quick switching-off-and-on operation, the computer program will deem the above steps as a color temperature switching operation and will switch the color temperature to 4,000K. If a third quick switching-off-and-on operation is performed within 0.5-3 seconds (t1) following the second quick switching-off-and-on operation, the computer program will deem that the color temperature needs to be switched continuously, and will switch the color temperature to 5,000K. If the user thinks that a color temperature of 5,000K is too high and wants to change it, the user only needs to perform another quick switching-off-and-on operation within 0.5-3 seconds (t1) following the third quick switching-off-and-on operation. By doing so, the color temperature is cyclically switched in the order of 3,000K, 4,000K, 5,000K and 3,000K, and the user may select a desired color temperature from these values.

After the color temperature of the lamp is witched to 5,000K for 6 seconds (t5), if the lamp is not switched off or no switching action is performed, the color temperature of 5,000K of the lamp is stored. After the color temperature is stored, if the user switches off the lamp for 6 seconds (t4) and switches on the lamp again, the stored color temperature will be called and the lamp will work under the color temperature of 5,000K. As described above, the lamp will work under the sensor working mode by default. In the present embodiment, t3=t4=6 seconds. If the user switches off the lamp for 6 seconds and switches on the lamp again, he/she can clearly know the color temperature and the working mode of the lamp.

If the user wants to switch the lamp from its sensor working mode to its continuous lighting mode, he/she only needs to perform a quick switching-off-and-on operation after the lamp is switched on and works under the sensor working mode for 15 seconds (t2). If the user performs a quick switching-off-and-on operation after the lamp works under the sensor working mode for 15 seconds (t2), the lamp can be switched from its continuous lighting mode to its sensor working mode. Alternatively, as described above, if the lamp is switched off for 6 seconds (t3) and is switched on again, it can be switched to its sensor working mode by default.

The computer program allows the user to change the color temperatures of the lamp only when the lamp is in the sensor working mode (or the state A of the second group of working states), and does not allow changing of the color temperatures of the lamp when the lamp is in the continuous lighting mode. Therefore, if the lamp works in the continuous lighting mode, and the user wants to switch the color temperature of the lamp from 5,000K to 3,000K, he/she first needs to switch the lamp to the sensor working mode, then switches the color temperature to 3,000K and switches the lamp to the continuous lighting mode. In the present embodiment, if the lamp is switched off for a long time and is switched on again, the lamp will enter the sensor working mode. If the color temperature needs changing, the lamp should work in the sensor working mode. As such, the user can easily remember the working mode of the lamp, and can switch the color temperature immediately when the lamp is switched on again.

The steps of the present method may be realized by functional modules, which may be implemented mainly by a computer program stored in a computer-readable storage medium.

The invention claimed is:

1. A method for controlling a lamp based on a switching action, wherein if a switching-on action is detected, the lamp is switched on, and if a switching-off action is detected, the lamp is switched off; and wherein, another switching-on action performed within a period t0 after the switching-off action is detected is defined as a quick switching-off-and-on operation;

the method further comprises: a first switching step in which when the lamp is switched on, after a quick switching-off-and-on operation is detected, if another quick switching-off-and-on operation is detected within a period t1, a first group of working states are switched; and a second switching step in which if the lamp is switched on for a period t2 which is longer than the period t1, and if yet another quick switching-off-and-on operation is detected, a second group of working states are switched;

wherein switching of the first group of working states is allowed only under a state A of the second group of working states, and is not allowed under other states of the second group of working states.

2. The method of claim 1, wherein the lamp is a sensor lamp, switching of the second group of working states is switching of working modes, and one state of the second group of working states is a sensor mode.

3. The method of claim 1, wherein the lamp is a sensor lamp, and switching of the first group of working states is switching of color temperatures.

4. The method of claim 1, wherein the first group of working states for switching includes two or at least three working states; after said another quick switching-off-and-on operation is detected in the first switching step, if yet another quick switching-off-and-on operation is detected within the period t1, the first group of working states are switched.

5. The method of claim 1, wherein switching of the first group of working states is cyclic.

6. The method of claim 1, wherein if a switching-on action is detected after the lamp is switched off for a period t3 which is longer than the period t0, the lamp works under the state A of the second group of working states by default.

7. The method of claim 6, wherein the period t3 is between 3 seconds and 10 seconds.

8. The method of claim 6, further comprising:

a storing step in which if the lamp is switched off, the latest one of the first group of working states of the lamp before the lamp is switched off is stored; and a reading step in which if a switching-on action is detected after the lamp is switched off for a period t4 which is longer than the period t0, the lamp works under the latest one of the first group of working states stored in the storing step, and in which t4=t3.

9. The method of claim 1, wherein the lamp is a sensor lamp, switching of the second group of working states is switching of working modes, and the state A of the second group of working states is a sensor mode.

10. The method of claim 1, further comprising:
a storing step in which if the lamp is switched off, the latest one of the first group of working states of the lamp before the lamp is switched off is stored; and
a reading step in which if a switching-on action is detected after the lamp is switched off for a period t4 which is longer than the period t0, the lamp works under the latest one of the first group of working states stored in the storing step.

11. The method of claim 10, wherein the storing step is triggered after the lamp is switched on and works under a certain state of the first group of working states for a period t5 which is longer than the period t1.

12. The method of claim 11, wherein the period t5 is shorter than the period t2.

13. The method of claim 1, wherein the period t0 is not longer than 3 seconds, and/or the period t1 is not longer than 3 seconds, and/or the period t2 is not shorter than 15 seconds.

\* \* \* \* \*